United States Patent [19]

Sobotta

[11] 4,308,759
[45] Jan. 5, 1982

[54] WORM GEAR MOUNT

[75] Inventor: Reinhard Sobotta, Braunschweig, Fed. Rep. of Germany

[73] Assignee: Rollei-Werke Franke & Heidecke, Braunschweig, Fed. Rep. of Germany

[21] Appl. No.: 829,156

[22] Filed: Aug. 30, 1977

[30] Foreign Application Priority Data

Sep. 9, 1976 [DE] Fed. Rep. of Germany ... 7628190[U]

[51] Int. Cl.³ .................. F16H 35/00; F16C 35/00
[52] U.S. Cl. .................................. 74/384; 308/37; 308/28; 74/89.14; 74/425
[58] Field of Search .................. 74/89.14, 384, 416, 74/421 R; 308/26, 28, 237, 8, 34; 248/54 R, 55, 58, 130, 131

[56] References Cited

U.S. PATENT DOCUMENTS 2,220,537 11/1940 Murrin .................. 74/425

Primary Examiner—Samuel Scott
Assistant Examiner—G. Anderson
Attorney, Agent, or Firm—Stonebraker, Shepard & Stephens

[57] ABSTRACT

A worm gear mount of a type used in slide projectors includes a shaft, a pair of bearings supporting the shaft, a drive wheel on an end overhang of the shaft extending beyond one of the bearings, a worm gear on the shaft betweeen the bearings, and a gear wheel rotatable on an axis perpendicular to the shaft and meshing with the worm gear. The bearings are formed with generally U-shaped openings that face toward the gear wheel, and the openings allow the shaft to be moved into the bearings from the region occupied by the gear wheel. The gear wheel serves to prevent movement of the shaft out of the openings, and the openings are preferably shaped so that the shaft has a snap fit in the bearings. The shaft is also preferably formed with reduced diameter journal portions fitting in the bearings to prevent axial movement of the shaft.

9 Claims, 3 Drawing Figures

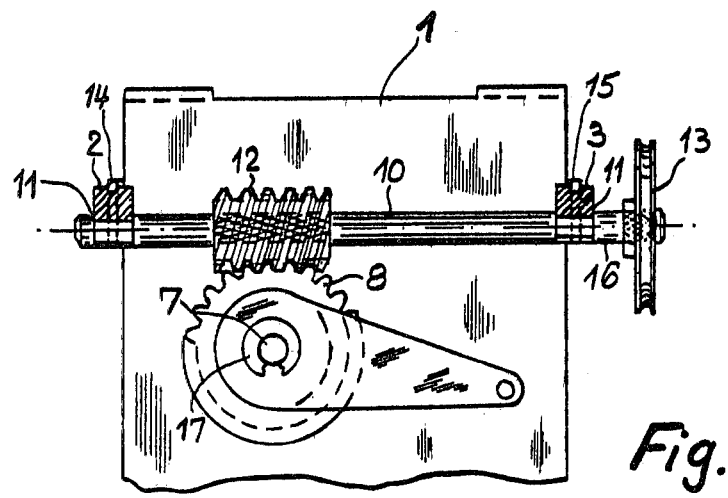
Fig. 1
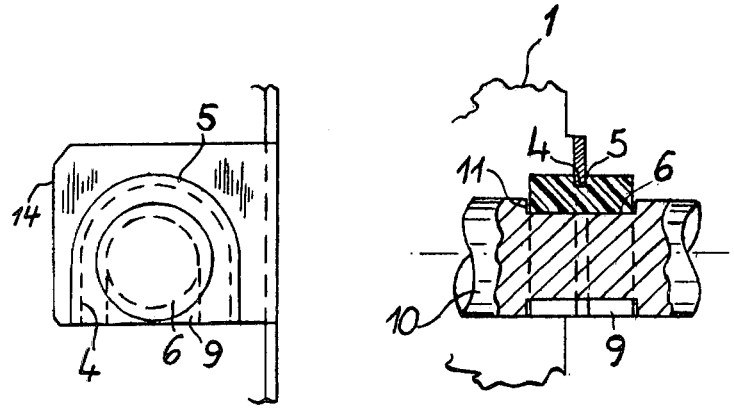
Fig. 2
Fig. 3

WORM GEAR MOUNT

BACKGROUND OF THE INVENTION

A worm gear mount used in slide projectors for slide change devices and magazine transport generally includes a shaft supported in a pair of bearings with a worm gear on the shaft between the bearings and a drive wheel on an end overhang of the shaft extending beyond one of the bearings. The drive wheel is ordinarily molded onto the shaft, but because the worm gear is mounted between the bearings, it must be assembled onto the shaft as the shaft is mounted in the bearings, and axial displacement of the shaft or the worm gear must be prevented by additional parts such as circlips. Considerable labor and parts costs are involved in assembling such a worm gear mount.

The invention involves recognition of the disadvantages of previous worm gear mounts of this type, and proposes a new mount that eliminates several parts, allows greater manufacturing economy, and reduces labor assembly costs. The invention aims at simplicity, economy, and reliability in a worm gear mount.

SUMMARY OF THE INVENTION

The inventive worm gear mount includes a shaft, a pair of bearings supporting the shaft, a drive wheel on an end overhang of the shaft extending beyond one of the bearings, a worm gear on the shaft between the bearings, and a gear wheel rotatable on an axis perpendicular to the shaft and meshing with the worm gear. The bearings are formed with generally U-shaped openings that face toward the gear wheel, and the openings are shaped to allow the shaft to be moved into the bearings from the region occupied by the gear wheel. The gear wheel meshing with the worm gear serves to prevent movement of the shaft out of the openings. The bearings are preferably formed of resilient material, and the openings are preferably slightly smaller than the diameter of journal portions of the shaft fitting in the bearings so that the shaft has a snap fit in the bearings. The shaft is also preferably formed with reduced diameter journal portions fitting in the bearings to prevent axial movement of the shaft.

DRAWINGS

FIG. 1 is a partially cut-away, front elevational view of a preferred embodiment of the invention;

FIG. 2 is an enlarged axial end view of the worm gear shaft of the embodiment of FIG. 1; and FIG. 3 is an enlarged, partially cut-away, fragmentary view of one of the bearings of the device of FIG. 1.

DETAILED DESCRIPTION

Mounting plate 1 for the inventive worm gear mount has a pair of bearing supports 14 and 15 that are bent away from the edge of plate 1 to extend at right angles from plate 1, and supports 14 and 15 each have a U-shaped cutout 4. A pair of preferably resin bearings 2 and 3 have a U shape that corresponds with cutouts 4 to be mounted on respective supports 14 and 15 by means of a groove 5 that fits around cutouts 4. Groove 5 preferably has a snug fit relative to the bearing supports so that bearings 2 and 3 can be pressed onto and retained by supports 14 and 15.

Bearings 2 and 3 each have a generally U-shaped opening 9 having a circular bore 6 for rotatably receiving shaft 10. Openings 9 open outward in the direction of gear wheel 8 mounted on shaft 7 which is perpendicular to the axis of shaft 10. Shaft 10 can be moved into openings 9 from the region occupied by gear wheel 8 to be seated in the circular portions 6 of bearings 2 and 3, and opening 9 is sufficiently wide to allow such insertion of shaft 10 into bearings 2 and 3.

Shaft 10 preferably has reduced diameter journal portions 11 fitting into the bearings so that the full diameter portions of shaft 10 adjacent journals 11 engages end surfaces of bearings 2 and 3 and prevents any axial movement of shaft 10. Drive wheel 13 is preferably molded onto shaft 10 on an end overhang 16 extending beyond bearing 3, and worm gear 12 is also preferably molded onto shaft 10 in the region between journals 11 to be located between the bearings.

To assemble the illustrated worm gear mount, bearings 2 and 3 are slid onto supports 14 and 15, and shaft 10, with its worm gear 12 and drive wheel 13 in place, is moved into openings 9 to be seated in the bearings. Then gear wheel 8 is assembled onto its shaft 7 in a generally known way and held aganst axial movement by circlip 17. Gear wheel 8 serves to prevent any movement of shaft 10 out of openings 9 so that the worm gear mount is secure in its bearings. This eliminates any need for separate assembly of worm gear 12 on shaft 10 or use of circlips or other devices to prevent axial movement of shaft 10 relative to its bearings or axial movement of worm gear 12 relative to shaft 10. Several parts are eliminated, bearings are simplified, and the mount is economical, reliable, easily assembled, and secure.

With bearings 2 and 3 preferably formed of resin material, openings 9 can have a gap slightly less than the diameter of journals 11 so that a snap fit occurs when shaft 10 is pressed into the bearings. The resilience of the bearings allows such a snap fit, which indicates proper assembly and helps retain shaft 10 within its bearings.

What is claimed is:

1. A worm gear assembly comprising bearing support means, two bearings supported by said support means in axially spaced relation to each other, each of said bearings having a shaft-receiving recess of substantially U-shaped configuration open at one side, the open sides of both bearings being faced in the same direction, a first shaft mounted in said recesses of said bearings, a worm gear on said shaft between said bearings, a second shaft spaced from and extending in a direction approximately perpendicular to said first shaft, and a gear wheel on said second shaft meshing with said worm gear on said first shaft, said gear wheel making contact with a side of said worm gear most remote from the bottoms of said U-shaped configurations of said bearings so that contact of said gear wheel against said worm gear prevents said first shaft from moving out of the open sides of said bearings.

2. The invention defined in claim 1, wherein the portion of said first shaft in at least one of said bearings is of reduced diameter compared to the portions immediately outside of such bearings, so that said outside portions form shoulders restricting endwise movement of said first shaft relative to such bearing.

3. The invention defined in claim 1, wherein said worm gear is formed integrally on said first shaft.

4. The invention defined in claim 1, wherein said first shaft has an overhanging portion extending axially beyond one of said bearings on the other side thereof from said worm gear, and a drive wheel on said overhanging portion.

5. The invention defined in claim 4, wherein said drive wheel is formed integrally on said first shaft.

6. The invention defined in claim 5, wherein said worm wheel is formed integrally on said first shaft.

7. The invention defined in claim 1, wherein said bearings are formed of resilient resin material.

8. The invention defined in claim 7, wherein the openings through which said first shaft is inserted transversely into said bearings are of slightly smaller size than the diameter of the portions of the shaft to be inserted into the bearings, so that said first shaft has a snap fit in said bearings.

9. A worm gear assembly comprising bearing support means, two shaft bearings supported by said support means in axially spaced relation to each other, each of said shaft bearings when in final mounted position in said support means being of a shape to encircle only one-half of the circumference of a shaft placed therein and being open at one side with an opening of such a size that a shaft may be mounted in the two shaft bearings by moving the shaft transversely to the length of the shaft into the open sides of the shaft bearings, a first shaft having a worm gear thereon, said first shaft being mounted in said two shaft bearings by a motion transverse to the length of said first shaft to move it into the open sides of the two shaft bearings after the bearings are in their final mounted positions in said support means, the worm gear being located between the two shaft bearings when the shaft is mounted therein, a second shaft spaced from said first shaft and extending in a direction perpendicular to said first shaft, and a gear wheel on said second shaft meshing with said worm gear on said first shaft and engaging said worm gear in such position as to prevent said first shaft from moving out of the open sides of said two shaft bearings, said first shaft being retained in said two shaft bearings and kept from moving out of the open sides of the shaft bearings primarily by the engagement of said gear wheel with said worm gear.

* * * * *